(12) United States Patent
Jaeger et al.

(10) Patent No.: US 9,998,761 B2
(45) Date of Patent: Jun. 12, 2018

(54) APPARATUS FOR CODING A BIT STREAM REPRESENTING A THREE-DIMENSIONAL VIDEO

(71) Applicant: Huawei Technologies Co., Ltd., Shenzhen (CN)

(72) Inventors: Fabian Jaeger, Aachen (DE); Mathias Wien, Aachen (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 507 days.

(21) Appl. No.: 14/595,966

(22) Filed: Jan. 13, 2015

(65) Prior Publication Data

US 2015/0124867 A1 May 7, 2015

Related U.S. Application Data

(63) Continuation of application No. PCT/EP2012/063846, filed on Jul. 13, 2012.

(51) Int. Cl.
*H04N 19/597* (2014.01)
*G06T 9/00* (2006.01)
(Continued)

(52) U.S. Cl.
CPC ........... *H04N 19/597* (2014.11); *G06T 9/001* (2013.01); *G06T 9/40* (2013.01); *H04N 13/0048* (2013.01);
(Continued)

(58) Field of Classification Search
CPC .. H04N 19/597; H04N 19/105; H04N 19/136; H04N 19/14; H04N 19/179; H04N 13/0048; G06T 9/001; G06T 9/40
See application file for complete search history.

(56) References Cited

U.S. PATENT DOCUMENTS

2009/0161989 A1 6/2009 Sim
2012/0200669 A1* 8/2012 Lai .......................... G06T 5/002
348/43
(Continued)

FOREIGN PATENT DOCUMENTS

| CN | 101374242 A | 2/2009 |
|---|---|---|
| CN | 101465004 A | 6/2009 |
| WO | WO 2011046607 A2 | 4/2011 |

OTHER PUBLICATIONS

"Call for Proposals on 3D Video Coding Technology," ISO/IEC JTC1/SC29/WG11 MPEG2011/N12036, Geneva, Switzerland, International Organization for Standardization, London, England (Mar. 2011).

(Continued)

*Primary Examiner* — Christopher Findley
(74) *Attorney, Agent, or Firm* — Leydig, Voit & Mayer, Ltd.

(57) ABSTRACT

The disclosure relates to an apparatus for coding a bit stream representing a three-dimensional video comprising a sequence of views, wherein a depth map is associated to each view, the depth map comprising depth information of the view with respect to a position to the camera capturing the view, the apparatus comprising: a partitioner for partitioning the depth map into coding units; a determiner for determining a type of model function for each coding unit based on the depth information of the coding unit; a reducer for reducing the coding unit to a single residual value for each segment generated by model function; and a signaler for signaling the model function used and the residual value into the bitstream.

18 Claims, 4 Drawing Sheets

(a)

(b)

(51) Int. Cl.
G06T 9/40 (2006.01)
H04N 13/00 (2018.01)
H04N 19/105 (2014.01)
H04N 19/136 (2014.01)
H04N 19/14 (2014.01)
H04N 19/179 (2014.01)

(52) U.S. Cl.
CPC ......... *H04N 19/105* (2014.11); *H04N 19/136* (2014.11); *H04N 19/14* (2014.11); *H04N 19/179* (2014.11); *H04N 2213/003* (2013.01)

(56) References Cited

U.S. PATENT DOCUMENTS

| | | | | |
|---|---|---|---|---|
| 2012/0229602 | A1* | 9/2012 | Chen | H04N 19/597 348/43 |
| 2013/0022111 | A1* | 1/2013 | Chen | H04N 19/50 375/240.12 |
| 2013/0034171 | A1* | 2/2013 | Winken | H04N 19/597 375/240.25 |
| 2013/0272401 | A1* | 10/2013 | Seregin | H04N 19/00533 375/240.12 |
| 2014/0085416 | A1* | 3/2014 | Chang | H04N 13/0048 348/43 |
| 2014/0192155 | A1* | 7/2014 | Choi | H04N 19/00769 348/43 |
| 2014/0341290 | A1* | 11/2014 | Merkle | H04N 19/52 375/240.16 |
| 2015/0172714 | A1* | 6/2015 | Wu | H04N 19/597 375/240.12 |
| 2015/0245061 | A1* | 8/2015 | Chen | H04N 19/597 375/240.13 |

OTHER PUBLICATIONS

Weigand et al., "WD1: Working Draft 1 of High-Efficiency Video Coding," Joint Collaborative Team on Video Coding (JCT-VC) of ITU-T SG16 WP3 and ISO/IEC JTC1/SC29/WG11, JCTVC-C403, 3rd Meeting, Guangzhou, China, International Telecommunication Union, Geneva, Switzerland (Oct. 7-15, 2010).

Morvan et al., "Platelet-based coding of depth maps for the transmission of multiview images," Proceedings of SPIE 6055, Stereoscopic Displays and Applications XVII, International Society for Optical Engineering, Bellingham, Washington (Jan. 27, 2006).

"Test Model under Consideration for HEVC based 3D video coding," ISO/IEC JTC1/SC29/WG11 MPEG2011/N12559, San Jose, California, International Organization for Standardization, London, England (Feb. 2012).

Sarkis et al., "Fast Depth Map Compression and Meshing with Compressed Tritree," 9th Asian Conference on Computer Vision, pp. 44-55, Springer, Berlin, Germany (Sep. 23-27, 2009).

Morvan et al., "Novel Coding Technique for Depth Images using Quadtree Decomposition and Plane Approximation," Proceedings of the SPIE 5960, Visual Communications and Image Processing, International Society for Optical Engineering, Bellingham, Washington (Jul. 2006).

Jager, "Contour-based Segmentation and Coding for Depth Map Compression," Visual Communications and Image Processing, Institute of Electrical and Electronics Engineers, New York, New York (Nov. 6-9, 2011).

Merkle et al., "Multi-view Video Plus Depth Representation and Coding," International Conference on Image Processing, Institute of Electrical and Electronics Engineers, New York, New York (Oct. 2007).

Liu et al., "Sparse Dyadic Mode for Depth Map Compression," International Conference on Image Processing, Institute of Electrical and Electronics Engineers, New York, New York (Sep. 26-29, 2010).

Merkle et al., "The effects of multiview depth video compression on multiview rendering," Signal Processing: Image Communication 24, pp. 73-88, Elsevier, Amsterdam, Netherlands (2009).

Jaeger, "3D-CE6.h related: Model-based Intra Coding for Depth Maps using a Depth Lookup Table," Joint Collaborative Team on 3D Video Coding Extension Development of ITU-T SG 16 WP 3 and ISO/IEC JTC 1/SC 29/WG 11, Document JCT2-A0010, 1st Meeting: Stockholm, Sweden (Jul. 16-20, 2012).

Hsu et al., "AHG4: Wavefront tile parallel processing," Joint Collaborative Team on Video Coding (JCT-VC) of ITU-T SG16 WP3 and ISO/IEC JTC1/SC29/WG11, Document: JCTVC-G199, 7th Meeting: Geneva, Switzerland (Nov. 21-30, 2011).

* cited by examiner

APPARATUS FOR CODING A BIT STREAM REPRESENTING A THREE-DIMENSIONAL VIDEO

CROSS-REFERENCE TO RELATED APPLICATION

This application is a continuation of International Patent Application No. PCT/EP2012/063846, filed on Jul. 13, 2012, which is hereby incorporated by reference in its entirety.

BACKGROUND OF THE INVENTION

The present invention relates to an apparatus and a method for coding a bit stream representing a three-dimensional (3D) video.

The 3D Video is a new technology, which requires the transmission of depth data alongside the conventional 2D video data to allow for more flexibility at the receiver side. The additional depth information allows to synthesize arbitrary viewpoints which then enables adaptation of the perceived depth impression and driving of multi-view autostereoscopic displays. By adding depth information to every transmitted view the amount of data to be coded increases significantly. Compared to conventional, natural video depth maps are characterized by piecewise smooth regions bounded by sharp edges along depth discontinuities. Using conventional video coding approaches to compress depth maps results in strong ringing artifacts along these depth discontinuities, which lead to visually disturbing geometric distortions in the view synthesis process. Preserving the described signal characteristics of depth maps is therefore a crucial requirement for new depth coding algorithms.

Recent developments in the field of 3D display technologies like for auto-stereoscopic displays or stereo displays, which allow to adapt the depth impression to the viewer's personal preference, require to synthesize additional arbitrary views based on the limited number of available decoded views. To allow for this extend of flexibility, depth information needs to be available at the receiver side and consequently needs to be coded in addition to the conventional 2D video data. These additional depth maps show different signal characteristics compared to natural video data. Moreover, distortions in depth maps have an indirect impact on the visual quality of the displayed video as they are used to synthesize new views of the same scene and are never shown to the user themselves. Compressing depth maps with algorithms optimized for natural 2D videos results in strong ringing artifacts along depth discontinuities, which then produce geometric distortions in the synthesized views.

Previous work on compression of depth data regarded depth data as gray-colored video and compressed it with conventional transform-based video coding algorithms as found in H.264/AVC, e.g. "P. Merkle, A. Smolic, K. Muller, and T. Wiegand, "Multi-view video plus depth representation and coding," 14th IEEE International Conference on Image Processing (ICIP). IEEE, 2007, pp. 1201-1204 ". It was shown that these conventional coding tools yield relatively high compression efficiency in terms of PSNR, but at the same time introduce ringing artifacts along sharp edges in the original depth maps. These artifacts result in geometric distortions in the view synthesis stage. More recent depth compression algorithms approximate the depth map's signal characteristics by partitioning into triangular meshes as described in "M. Sarkis, W. Zia, and K. Diepold, "Fast depth map compression and meshing with compressed tritree," Computer Vision—ACCV 2009, pp. 44-55, 2010" or platelets as described in "Y. Morvan, P. de With, and D. Farin, "Platelet-based coding of depth maps for the transmission of multiview images," in Proceedings of SPIE, Stereoscopic Displays and Applications, vol. 6055, 2006, pp. 93-100," and modeling each segment by an appropriate 2D function. These pure model-based approaches can also be combined with conventional transform based tools by introducing an additional coding mode, like the sparse-dyadic mode described in "S. Liu, P. Lai, D. Tian, C. Gomila, and C. Chen, "Sparse dyadic mode for depth map compression," in 17th IEEE International Conference on Image Processing (ICIP). IEEE, 2010, pp. 3421-3424." Here, a sparse-dyadic-coded block is partitioned into two segments, which are described by two constant depth values. As the preservation of depth discontinuities is the most important when compressing depth maps, another approach is to losslessly compress the location of these discontinuities and approximate the piecewise smooth regions, as previously proposed in "F. Jager, "Contour-based segmentation and coding for depth map compression," in Visual Communications and Image Processing (VCIP), 2011 IEEE, pp. 1-4." The disadvantage of this approach is the inability of reaching low bitrates due to the lossless encoding of depth contours.

In summary, when coding depth maps with conventional algorithms optimized for textured video data, ringing artifacts along depth discontinuities are introduced due to transform and quantization. Typical depth map characteristics such as piecewise smooth regions bounded by strong edges need to be coded differently to allow for high quality view synthesis at the receiver. Conventional coding algorithms use advanced prediction methods like directional intra prediction and planar modes. These are able to approximate edges and gradients of depth maps to a certain extent. The directional prediction modes lack the ability to approximate edges, which are not continued from the top-right of the current coding unit. Moreover, the already known planar mode is unable to represent coding units, which are only partially characterized by a depth gradient as they contain two different depth segments.

SUMMARY

It is an object of the disclosure to provide a concept for an efficient coding for 3-dimensional videos that performs compression adapted to the signal characteristics of depth maps.

This object is achieved by the features of the independent claims. Further implementation forms are apparent from the dependent claims, the description and the figures.

A main idea of the disclosure is to provide a novel depth map model-based coder (DMC) method, which is an extension to the High Efficiency Video Coding (HEVC) coding model described in "T. Wiegand, B. Bross, W.-J. Han, J.-R. Ohm, and G. J. Sullivan, "Working Draft 3 of High-Efficiency Video Coding (HEVC)," Joint Collaborative Team on Video Coding (JCT-VC), Doc. JCTVC-C403, 2011." and replaces the intra coding tools by a model-based algorithm. Compared to other model-based approaches, new model functions for linear depth segments and more advanced prediction structures are introduced.

The basis of the novel depth map intra coder is formed by a block based approach, where each block is modeled by one of three available modes. Blocks of constant depth can be perfectly modeled by DC blocks. For modeling gradual depth areas a special planar mode is introduced. The third mode divides a block into two segments by a straight line. Each subsegment can then be modeled by a different DC value. This third mode allows to approximate the typical sharp edges describing object boundaries in depth maps. By explicitly signaling the location of these depth discontinuities ringing artifacts, like in traditional transform-based coding, are completely absent. Block modes and their information are coded in a predictive manner. For all modes, the model parameters are predicted from neighboring blocks and only a resulting residual signal is coded in the bit stream. The prediction is always competitive, which means that values can be predicted from either a top or left neighboring block. For the final entropy coding of all flags and model parameters of the proposed coding method the well-known CABAC (Context Adaptive Binary Arithmetic Coding) algorithm is used.

DMC is implemented into the HEVC test model software as an alternative to the conventional intra-coding tools. Consequently, DMC is able to reuse many of the HEVC tools like frame partitioning into blocks (coding units), as well as the previously mentioned CABAC engine for entropy coding. In the following, all described coding tools are defined for arbitrary block sizes of $2^n \times 2^n$ pixels, starting with n>=2. When speaking of neighboring blocks, they are always located next to the top-left corner pixel of the actual block. Sizes of neighboring blocks are independent and do not have to match the current block's size.

In order to describe the disclosure in detail, the following terms, abbreviations and notations will be used:
CABAC: Context Adaptive Binary Arithmetic Coding;
DLT: Depth Lookup Table;
DMC: Depth Mode-based Coding;
CU: Coding Unit.
LCU: Largest Coding Unit According to a first aspect, the disclosure relates to an apparatus for coding a bit stream representing a three-dimensional video comprising a sequence of views, wherein a depth map is associated to each view, the depth map comprising depth information of the view with respect to the camera capturing the view, the apparatus comprising: a partitioner for partitioning the depth map into coding units; a determiner for determining a type of model function for each coding unit based on the depth information of the coding unit; a reducer for reducing the coding unit to a single residual value for each segment generated by the model function; and a signaler for signaling model function used and the residual value into the bitstream.

Synthesized views based on depth maps compressed with the proposed model-based (or type-based) coding according to the first aspect show improved visual quality compared to synthesized views based on depth maps, which are compressed with conventional video coding tools.

In a first possible implementation form of the apparatus according to the first aspect, the apparatus further comprises: an indexer for indexing the depth information of the depth map with respect to depth levels indicated by the depth map obtaining indices associated to the depth information of the depth map; and a remapper for reducing the depth information size by remapping the depth map according to the indices.

In a second possible implementation form of the apparatus according to the first implementation form of the first aspect, the indexer is configured to perform the indexing of the depth information of the depth map over a predetermined number of views; and wherein the remapper is configured to perform the reducing the depth information size by using a lookup-table.

In a third possible implementation form of the apparatus according to the first implementation form of the first aspect or according to the second implementation form of the first aspect, the apparatus comprises: a mapper for mapping the depth level to its corresponding index in the depth map.

In a fourth possible implementation form of the apparatus according to the first aspect as such or according to any of the preceding implementation forms of the first aspect, the partitioner is configured to partitioning the depth map into coding units by: partitioning the depth map into fixed-sized coding units of a fixed size, in particular a fixed size of 64×64 pixels; arranging the coding units in a quad-tree structure by sub-dividing the fixed-sized coding units into the coding units of variable size, in particular a variable size of the coding units ranging from 4×4 pixels to 64×64 pixels; and signaling the quad-tree structure into the bitstream.

In a fifth possible implementation form of the apparatus according to the first aspect as such or according to any of the preceding implementation forms of the first aspect, the determiner is configured to perform the determining the type of segmentation for a coding unit by predicting from coding units arranged neighbored to the coding unit in the quad-tree structure.

A quadtree is a tree data structure in which each internal node has exactly four children. Quadtrees are most often used to partition a two dimensional space by recursively subdividing it into four quadrants or regions. The regions may be square or rectangular, or may have arbitrary shapes.

In a sixth possible implementation form of the apparatus according to the first aspect as such or according to any of the preceding implementation forms of the first aspect, the determiner is configured to perform the determining the type of model function by: determining a DC type if the depth information of the coding unit indicates a constant depth; determining a gradient type if the depth information of the coding unit indicates a gradual depth change; determining an edge type if the depth information of the coding unit indicates two segments of different but constant depth; and determining a texture type in all other cases.

In a seventh possible implementation form of the apparatus according to the sixth implementation form of the first aspect, the determiner is configured to perform the determining the DC model function for a coding unit by: determining a DC value by predicting the depth information from one of a neighboring coding unit arranged to the left of a top-left corner pixel of the coding unit and a neighboring coding unit arranged to the top of a top-left corner pixel of the coding unit.

In an eighth possible implementation form of the apparatus according to the sixth implementation form or according to the seventh implementation form of the first aspect, the determiner is configured to perform the determining the gradient type of segmentation for a coding unit by: interpolating a gradual depth change of a bottom row of the coding unit from a first pixel in the bottom row of the coding unit to a target pixel in a lower-right corner of the coding unit; interpolating a gradual depth change of a right column from a second pixel in a right column of the coding unit to the target pixel (Z) in the lower-right corner of the coding unit; and bilinearly interpolating the gradual depth change from the gradual depth change of the bottom row and the gradual depth change of the right column.

In a ninth possible implementation form of the apparatus according to any of the sixth to the eighth implementation forms of the first aspect, the determiner is configured to perform the determining the edge type of segmentation for a coding unit by: dividing the coding unit into the two segments by a straight line; and determining a DC value of a first one of the two segments by predicting the depth information from one of a neighboring coding unit arranged to the left of a top-left corner pixel of the coding unit and a neighboring coding unit arranged to the top of a top-left corner pixel of the coding unit; and determining a DC value of a second one of the two segments by predicting the depth information from one of a neighboring coding unit arranged to the right of a top-right corner pixel of the coding unit and a neighboring coding unit arranged to the top of a top-right corner pixel of the coding unit.

In a tenth possible implementation form of the apparatus according to any of the sixth to the ninth implementation forms of the first aspect, the determiner is configured to perform the determining the texture type of segmentation for a coding unit by: dividing the coding unit into at least three segments by straight lines; and determining a number of segments the coding unit is divided into.

In an eleventh possible implementation form of the apparatus according to the first aspect as such or according to any of the preceding implementation forms of the first aspect, the apparatus is configured to switch the coding of the bit stream with respect to one of the following segments of the bit stream: a sequence of views, a picture, a slice, a coding unit, and a prediction unit.

In a twelfth possible implementation form of the apparatus according to the first aspect as such or according to any of the preceding implementation forms of the first aspect, the apparatus comprises: an interleaver configured for interleaving the coding units with coding units of the bit stream coded according to a conventional video coding, in particular coded according to a HEVC video coding or according to an AVC video coding.

According to a second aspect, the disclosure relates to a method for coding a bit stream representing a three-dimensional video comprising a sequence of views, wherein a depth map is associated to each view, the depth map comprising depth information of the view with respect to the camera position capturing the view, the method comprising: partitioning the depth map into coding units; determining a type of model function for each coding unit based on the depth information of the coding unit; reducing the coding unit to a single residual value for each segment generated by the model function; and signaling the residual value into the bitstream.

According to a third aspect, the disclosure relates to a computer program for performing the method according to the second aspect, wherein the computer program is run on a computer.

A further aspect of the disclosure relates to use of model-based intra coding for depth (DMC) as a replacement for conventional intra coding algorithms.

A further aspect of the disclosure relates to making usage of DMC switchable per sequence, per picture, per slice, per coding unit and per prediction unit.

A further aspect of the disclosure relates to Interleaving DMC coding units (CU) with conventional intra CUs.

A further aspect of the disclosure relates to predict mode parameters between DMC and conventional intra coded blocks.

A further aspect of the disclosure relates to signaling the usage of DMC for the specified coding level in the corresponding parameter set.

A further aspect of the disclosure relates to using motion compensated pixel data without any residual signal in inter-coded frames.

A further aspect of the disclosure relates to updating modeling parameters in motion compensated frames.

A further aspect of the disclosure relates to an adaptive lookup table for input depth values to reduce signal bit depth for depth maps with only few depth levels.

A further aspect of the disclosure relates to using model function to describe depth map characteristics for each coding unit, wherein the characteristics comprise: DC value for coding units with constant depth; Planar mode for coding units with gradual depth areas by signaling bottom-right pixel value and interpolating other pixel values of current CU; and division of coding units into two segments by a straight line (edge). Each segment can be modeled by a DC value or by a planar segment and a DC value.

A further aspect of the disclosure relates to predicting parameters for the three modeling functions from neighboring blocks by predicting edge direction from neighboring blocks into current coding unit and signal position offset to update edge in current CU; and gradient of corner pixels of neighboring blocks predict bottom-right pixel value for planar mode.

By introducing a reduced set of modeling functions to describe the typical characteristics of depth maps, ringing artifacts and other coding artifacts of conventional algorithms can be eliminated. Furthermore, coding according aspects of the disclosure allows for better view synthesis quality compare to conventional transform-based coding approaches. Due to the reduced set of possible modeling functions or modes for each CU, the amount of signaling bits is also reduced, resulting in reduced bit rates.

Aspects of the disclosure describe a modified intra-coding scheme for depth map coding in 3D video. As depth maps show unique characteristics like piecewise smooth regions bounded by sharp edges at depth discontinuities, new coding tools are required to approximate these signal characteristics. In the current 3DV-HTM software, there are two kinds of intra prediction modes for depth maps: 1) The directional intra prediction known from HEVC and 2) the depth modeling modes (DMM). The latter can enhance the BD-rate of synthesized views especially when modeling the mentioned depth discontinuities.

According to aspects of the disclosure, a very similar prediction scheme as DMM is used to approximate the depth map's sharp edges. With DMM the resulting residual is transformed and quantized as with conventional intra prediction modes. At this stage the proposed Depth Mode-based Coding (DMC) does not use transform and quantization to code the resulting residual signal. The DMC prediction stage always results in two to three depth segments per CU and for each of these segments a single residual DC depth value is coded. By skipping the transform step and coding the residual based on the pixel-domain information, ringing artifacts are eliminated for DMC-coded blocks. Moreover, the number of bits to signal the residual values for each segment can be further reduced by integrating a Depth Lookup Table (DLT), which depth values maps to valid depth values of the original depth map. The DLT is constructed based on an initial analysis of the input depth map and is then coded in the SPS. For sequences with strongly quantized depth maps DLT yields additional gain on top of the gain coming from DMC alone.

The presented intra coding scheme for depth maps results in average BD-Rate savings of 4.02% (depth rate) and up to 8.75% (depth rate) for certain sequences, like Newspaper, Kendo and Balloons. In terms of the overall coding performance including texture and depth DMC yields 0.76% BD-Rate savings on average.

For an all-intra test case, the presented coding scheme yields average BD-Rate savings of 24.06% (depth rate) and up to 42.27% (depth rate) for the sequence Kendo. In terms of the overall intra coding performance including texture and depth DMC yields 1.46% BD-Rate savings on average.

The presented DMC coding approach is an extension of the intra coding mode, which is available in the HEVC-based 3DV-HTM reference software. For a DMC-coded block, the prediction mode is still INTRA. An additional DMC-Flag signals the usage of DMC prediction and coding. If a block is coded with DMC, partition size is always 2N×2N and therefore not signaled in the bitstream. Instead of coding quantized transform coefficients DMC-coded blocks need to code the following types of information: The type of segmentation/prediction of the current block. Possible values are DC (no segmentation), Gradient (no segmentation), Edge (segmentation into two segments by a straight line) and Texture (segmentation into 2 or 3 segments by thresholding the collocated texture block). For Edge- and Texture-segmentation, some details about the segmentation needs to be coded: For Edge-segmentation: Start/End of the straight line of the segmentation. For Texture-segmentation: Number of segments to split the block into.

For each segment, a residual value (in the pixel domain) is signaled in the bitstream Before coding, the residual values are mapped to values, which are present in the original, uncompressed depth map by using a Depth Lookup Table (DLT). Consequently, residual values can be coded by signaling only the index into this lookup table, which reduces the bit depth of residual magnitudes.

DMC-coded depth map coding units are predicted by one of four available prediction modes. The optimal mode is selected based on the VSO criterion and coded into the bitstream. The most probable mode is predicted from neighboring coding units. A flag codes whether the actual block mode matches the most probable mode. If this is not the case, up to two additional flags are required to signal the actual mode for the DMC-block. All the mentioned flags have their own new context models assigned for the CABAC engine. The directional intra-prediction modes of HEVC are not available for DMC-coded blocks as most of these can be modeled by the Edge segmentation mode, which will be explained in more detail in the following section.

BRIEF DESCRIPTION OF THE DRAWINGS

Further embodiments of the disclosure will be described with respect to the following figures, in which.

DETAILED DESCRIPTION OF EMBODIMENTS OF THE INVENTION

Figure 1:
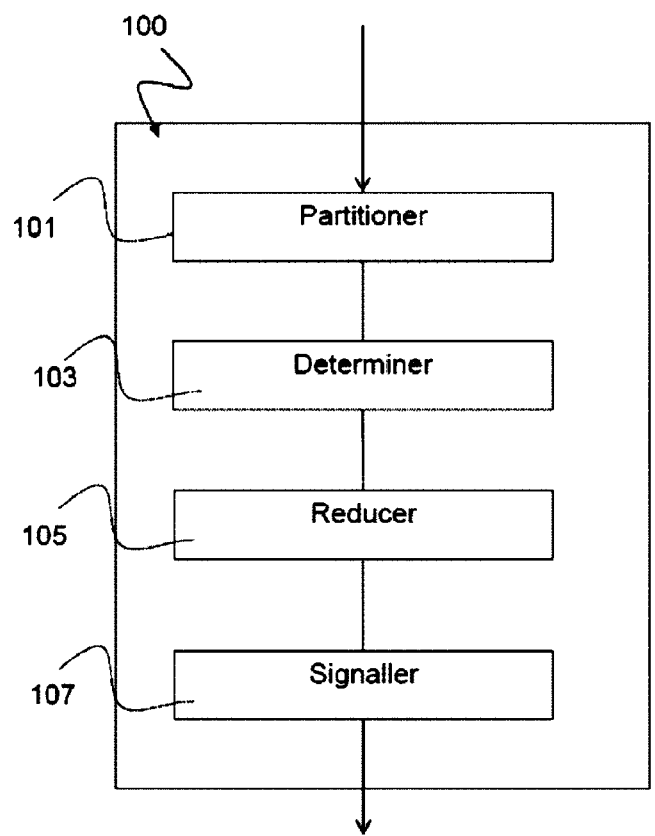
FIG. 1 shows a block diagram of an apparatus for coding a bit stream representing a three-dimensional video according to an implementation form.

FIG. 1 shows a block diagram of an apparatus 100 for coding a bit stream representing a three-dimensional video according to an implementation form.

The apparatus 100 is for coding a bit stream representing a three-dimensional video comprising a sequence of views, wherein a depth map is associated to each view, the depth map comprising depth information of the view with respect to the camera position capturing the view. The apparatus 100 comprises: a partitioner 101 for partitioning the depth map into coding units; a determiner 103 for determining a type of model function for each coding unit based on the depth information of the coding unit; a reducer 105 for reducing the coding unit to a single residual value for each segment generated by the model function; and a signaler 107 for signaling the model function type and the residual value into the bitstream.

In an implementation form, the apparatus 100 further comprises an indexer for indexing the depth information of the depth map with respect to depth levels indicated by the depth map obtaining indices associated to the depth information of the depth map; and a remapper for reducing the depth information size by remapping the depth map according to the indices.

In an implementation form, the indexer is configured to perform the indexing the depth information of the depth map over a predetermined number of views; and wherein the remapper is configured to perform the reducing the depth information size by using a lookup-table.

In an implementation form, the apparatus 100 comprises a mapper for mapping the depth level to its corresponding index in the depth map.

In an implementation form, the partitioner 101 is configured to partitioning the depth map into coding units by: partitioning the depth map into fixed-sized coding units of a fixed size, in particular a fixed size of 64×64 pixels; arranging the coding units in a quad-tree structure by sub-dividing the fixed-sized coding units into the coding units of variable size, in particular a variable size of the coding units ranging from 4×4 pixels to 64×64 pixels; and signaling the quad-tree structure into the bitstream.

In an implementation form, the determiner 103 is configured to perform the determining the type of segmentation for a coding unit by predicting from coding units arranged neighbored to the coding unit in the quad-tree structure.

In an implementation form, the determiner 103 is configured to perform the determining the type of segmentation by: determining a DC type if the depth information of the coding unit indicates a constant depth; determining a gradient type if the depth information of the coding unit indicates a gradual depth change; determining an edge type if the depth information of the coding unit indicates two segments of different but constant depth; and determining a texture type in all other cases.

In an implementation form, the determiner 103 is configured to perform the determining the DC type of segmentation for a coding unit by: determining a DC value by predicting the depth information from one of a neighboring coding unit arranged to the left of a top-left corner pixel of the coding unit and a neighboring coding unit arranged to the top of a top-left corner pixel of the coding unit.

In an implementation form, the determiner 103 is configured to perform the determining the gradient type of segmentation for a coding unit by: interpolating a gradual depth change of a bottom row of the coding unit from a first pixel (B) in the bottom row of the coding unit to a target pixel (Z) in a lower-right corner of the coding unit; interpolating a gradual depth change of a right column from a second pixel (A) in a right column of the coding unit to the target pixel (Z) in the lower-right corner of the coding unit; and bilinearly interpolating the gradual depth change from the gradual depth change of the bottom row and the gradual depth change of the right column.

In an implementation form, the determiner 103 is configured to perform the determining the edge type of segmentation for a coding unit by: dividing the coding unit into the two segments by a straight line; and determining a DC value of a first one of the two segments by predicting the depth information from one of a neighboring coding unit arranged to the left of a top-left corner pixel of the coding unit and a neighboring coding unit arranged to the top of a top-left corner pixel of the coding unit; and determining a DC value of a second one of the two segments by predicting the depth information from one of a neighboring coding unit arranged to the right of a top-right corner pixel of the coding unit and a neighboring coding unit arranged to the top of a top-right corner pixel of the coding unit.

In an implementation form, the determiner 103 is configured to perform the determining the texture type of segmentation for a coding unit by: dividing the coding unit into at least three segments by straight lines; and determining a number of segments the coding unit is divided into.

In an implementation form, the apparatus 100 is configured to switch the coding of the bit stream with respect to one of the following segments of the bit stream: a sequence of views, a picture, a slice, a coding unit, and a prediction unit.

In an implementation form, the apparatus comprises: an interleaver configured for interleaving the coding units with coding units of the bit stream coded according to a conventional video coding, in particular coded according to a HEVC video coding or according to an AVC video coding.

In the following DMC refers to an apparatus 100 for coding and/or decoding a bitstream representing a 3-dimensional video according to the first aspect or any of the implementation forms of the first aspect of the disclosure. The DMC method refers to a method according to the second aspect of the disclosure for coding and/or decoding a bitstream representing a 3-dimensional video. In the following a block modes refers to a type of segmentation according to aspects of the disclosure. A block refers to a coding unit.

Analysis of the 3DV test sequences from "MPEG Video and Requirement Groups, "Call for proposals on 3D video coding technology," MPEG output document N12036, Tech. Rep., March 2011." has shown, that all the estimated depth maps do not utilize the full available signal range of 8 bit. Only a small amount of different gray color values resembling the depth levels occur in those sequences due to strong quantization. In a first coding step, DMC therefore utilizes a mapping technique, which indexes all appearing depth values before remapping the depth map according to these indices. Thereby the signal bit-depth, as well as the residual signal coefficients used by other DMC coding tools are reduced.

As previously mentioned, DMC is a block based codec, reusing the hierarchical quad-tree splitting introduced by HEVC. The depth map is partitioned into Largest Coding Units (LCU) with a default size of 64×64 pixels. Each LCU can be subdivided into a hierarchical quad-tree structure. The partitioning results in various sized coding units (CU) and is able to take different levels of detail into account. By default, CUs cannot be smaller than 4×4 pixels. The quad-tree partitioning is signaled in the bitstream with corresponding split-flags the same way as in HEVC.

One of the three available model functions, also called types of segmentation, is assigned to each CU. The selected mode is coded into the bitstream in a predictive way. DMC derives the most probable block mode from the neighboring CUs. A flag codes whether the actual block mode matches the predicted mode. If this is not the case, an additional flag is required. Both flags have their own new context models assigned for the CABAC engine.

The DC-mode, also called DC type, models single colored areas with a single DC coefficient. DMC predicts the corresponding parameters from neighboring blocks, choosing between two available predictors, which are located to the left and to the top of the top-left corner pixel of the current block. A flag signals which of the two predictors to use. The residual is coded into the bitstream.

The Edge-Mode (EM), also called edge type, divides a block into two segments by a straight line as illustrated below described with respect to in FIG. 2a. Each segment is afterwards modeled by a single DC coefficient. For the first segment, prediction of this coefficient is identical to the DCMode. Segment 2 has a different set of predictors (cf. FIG. 2b), located at the bottom-left and top-right corners of the actual block. Depending on the block size, there are two different methods for coding of the parameters describing the dividing line. For 4×4 pixel-sized blocks, there is a distinct set of eight available edge-patterns. A corresponding 3 bit index is coded in the bitstream, bypassing the entropy coding engine. This pattern-based method is not suitable for bigger blocks and is consequently replaced by a different description of the edge: As depicted in FIG. 2a, an edge is defined by one of six start/end borders combinations and two indices. This information is again coded bypassing the entropy coder.

To enhance continuity of edges through multiple EM-coded blocks, DMC is able to code edge parameters in a predictive way. This applies, whenever a neighboring block is EM-coded and its edge leads into the current block. In this case, the start point of the current block's edge is predicted from the edge endpoint of the neighboring block. If that is the case, the actual border and position offsets are residual coded using the CABAC entropy coder.

DMC's Planar-Mode (PM) or gradient mode, also called gradient type, is introduced to model gradual color changes in depth maps. Input to this planar mode are the neighboring pixel values, as well as a target value Z in the lower-right corner of the current block. As depicted in FIG. 3, the bottom row is linearly interpolated from the values B and Z, the right column respectively from A and Z. In a second step, all remaining pixel values are bilinearly interpolated from the surrounding border values. Only the Z parameter is coded in the bitstream, also in a predictive and residual way. For the Z-coefficient prediction process, DMC distinguishes between two cases. If no neighboring block is PM-coded, the predictors are derived the same way as for the second segment in EM-blocks (cf. FIG. 2b). Otherwise, the gradient in neighboring PM-coded blocks is calculated from their corner pixel positions to interpolate the actual Z-coefficient. In the latter case, the prediction is only competitive, if both neighboring blocks are planar.

All DC-coefficients as well as the Planar-Mode's Z parameter are predicted by neighboring parameters, only the residual signal is coded in the bitstream. A first flag signals if its value is unequal zero. If that is the case, a sign flag is coded first. Bitplane coding is used for the magnitude of the residual. Each bit-position in each mode and segment has its own context model. Nonzero and sign flags also have their own contexts. The same holds for the nonzero and sign flags.

The DMC encoder makes coding decisions based on the Lagrangian method. A mode m is considered as the best mode by minimizing the RD cost function $J=D(m)+\lambda R(m)$.

Thereby the Lagrangian Multiplier λ gives control of the tradeoff between the rate R and the distortion D, measured as the sum of squared errors (SSE). Unlike HEVC, λ is not computed internally based on the quantization parameter (QP), but set directly in the encoder configuration as a parameter.

The DC prediction mode of DMC is suitable for regions with constant depth. The corresponding DC prediction value is predicted from neighboring blocks by mean of all directly adjacent samples of the top and the left tree block. The resulting residual is coded into the bitstream according to the coding step described below.

An analysis of the 3DV test sequences "MPEG Video and Requirement Groups, "Call for Proposals on 3D Video Coding Technology," *MPEG output document N*12036, March 2011" has shown that the estimated depth maps do not utilize the full available depth range of $2^8$. Only a small amount of different depth levels occur in those sequences due to strong quantization. In an initial analysis step, DMC therefore constructs a dynamic depth lookup-table by analyzing a certain number of frames of the input sequence. This depth lookup-table is used during the coding process to reduce the effective signal bit-depth and consequently the range of residual signal coefficients used by other DMC coding tools.

In the analysis step the encoder reads a pre-defined number of frames from the input video sequence to be coded and scans all pixels for available depth values. During this process a mapping table is generated that maps depth values to valid depth values based on the original uncompressed depth map.

In detail, the algorithm performs the following steps:
Input: Depth map $D_t$ of N×M pixels at time instance t
Output: Depth Lookup Table D(·)
  Index Lookup Table I (·)
  Depth Mapping Table M (·)
  Number of valid depth values $d_{valid}$
Algorithm:
0. Initialization
boolean vector B (d)=FALSE for all depth values d
index counter i=0
1. Process each pixel position p in $D_t$ for multiple time instances t:
Set B($D_t$(p))=TRUE to mark valid depth values
2. Count number of TRUE values in B(d)→$d_{valid}$
3. For each d with B(d)==TRUE:
Set D=d
Set M(d)=d
Set I(d)=i $$i=i+1$$

4. For each d with B(d)==FALSE:
Find $\hat{d}$=arg min|d−$\hat{d}$| and B($\hat{d}$)==TRUE
Set M(d)=$\hat{d}$
Set I(d)=I($\hat{d}$)

The coding step is as follows:
Instead of coding a residual depth value for a given coding unit, the depth value is mapped to its corresponding index in the list of valid depth maps. This mapping table needs to be transmitted to the decoder for the inverse lookup from index to valid depth value.

The advantage of using this lookup table is the reduced bit depth of the residual index for sequences with reduced depth range (e.g. all estimated depth maps in the MPEG 3DV activity described in "MPEG Video and Requirement Groups, "Call for Proposals on 3D Video Coding Technology," *MPEG output document N*12036, March 2011".

The algorithmic details are as follows:
Input: Original depth value $d_{orig}$
  Predicted depth value $d_{pred}$
  Index Lookup Table I (·)
  Number of valid depth values $d_{valid}$
Output: Residual index $i_{resi}$ to be coded
Algorithm:

$$i_{resi}=I(d_{orig})-I(d_{pred})$$

The computed residual index $i_{resi}$ is then coded with a significance flag, a sign flag and with $\lceil \log_2 d_{valid} \rceil$ bits for the magnitude of the residual index.

Figure 2:
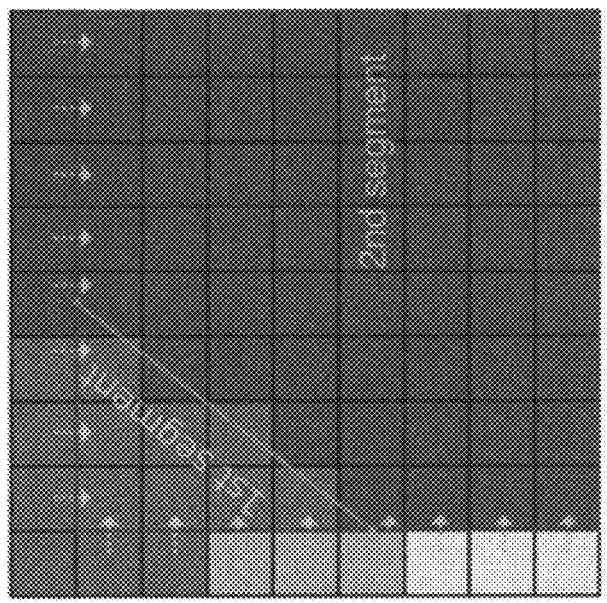
FIG. 2 shows a schematic diagram of an edge type determination in a determiner of an apparatus for coding a bit stream according to an implementation form.
Figure 2:
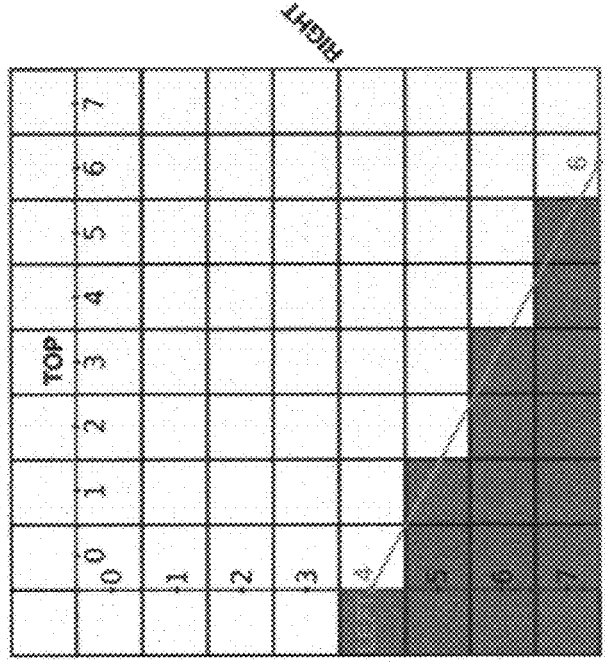
Figure 3:
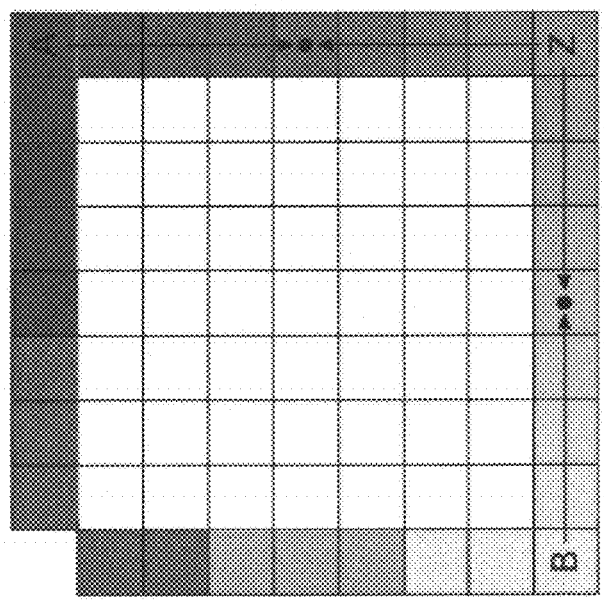
FIG. 3 shows a schematic diagram of a gradient type determination in a determiner of an apparatus for coding a bit stream according to an implementation form.
Figure 3:
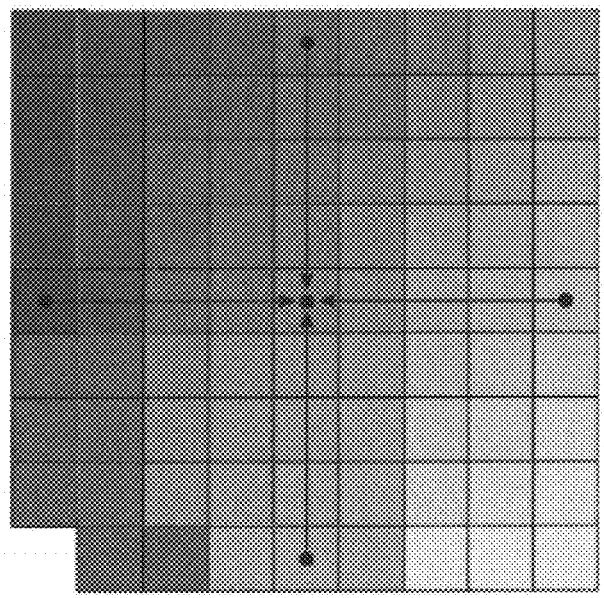

FIG. 2 shows a schematic diagram of an edge type determination in a determiner of an apparatus for coding a bit stream according to an implementation form.

The Edge Prediction (EP), also called determination of the edge type, divides a block into two segments by a straight line as illustrated in FIG. 2. Both segments are modeled by a DC value, which is predicted from the adjacent depth values of top and left coded tree blocks. The prediction of the two DC values is computed by the mean of neighboring depth values, which would belong to the same segment defined by the selected edge division. The resulting residual is coded according to the coding step described with respect to FIG. 1.

Six different start/end border combinations and two corresponding indices define the division of the current block into two segments. Two examples of these combinations are depicted in FIG. 2.

To improve continuity of edges through multiple EP-coded blocks and to reduce the required bitrate for edge signaling, DMC predicts the edge information from neighboring blocks. This applies, whenever a neighboring block is also using Edge Prediction and its edge leads into the current block. In this case, the start point of the current block's edge is predicted from the edge endpoint of that block and the endpoint of the current edge is predicted by continuing the slope of the neighboring edge into the current block. The actual border and position offsets relative to the prediction are residual coded using the CABAC entropy coder. A very similar prediction mode is found as part of the Depth Modeling Modes (DMM), which uses a different signaling of the edge information. Moreover, the resulting residual of DMM predicted blocks is still transform coded.

When predicting the depth map signal for a certain block it is also possible to incorporate the already coded, collocated block of the texture component of the same view. By applying a simple thresholding of the luminance component of the texture block, a segmentation of the block into two or three segments is computed. The resulting segmentation mask is then used to compute the mean depth value of each of these segments. The resulting DC values are again predicted similarly as with Edge or DC Prediction by the mean depth value of directly adjacent samples of the particular segment. The resulting residual is coded according to the coding step described with respect to FIG. 1.

Depth Modeling Modes (DMM) as they are in the current reference software also allow texture-to-depth prediction, but the DMM is more restrictive as it does only allow for two segments and there is a subsequent transform step instead of coding the depth values directly.

FIG. 3 shows a schematic diagram of a gradient type determination in a determiner of an apparatus for coding a bit stream according to an implementation form.

DMC's Gradient Prediction (GP), also called determination of the gradient type, is introduced to model gradual depth changes in depth maps. Inputs to this mode are the neighboring pixel values, as well as a target value Z in the lower-right corner of the current block. As depicted in FIG. 3, the bottom row is linearly interpolated from the values B and Z, the right column respectively from A and Z. In a second step, all remaining pixel values are bilinearly interpolated from the surrounding values.

The Z parameter is again predicted from the directly adjacent depth samples of the upper and left coded tree block. By computing the horizontal gradient at the top and the vertical gradient at the left side of the current block, the Z value can be predicted by adding these two gradients to the depth value at the top-left position. The resulting residual is coded according to the coding step described with respect to FIG. 1.

Figure 4:
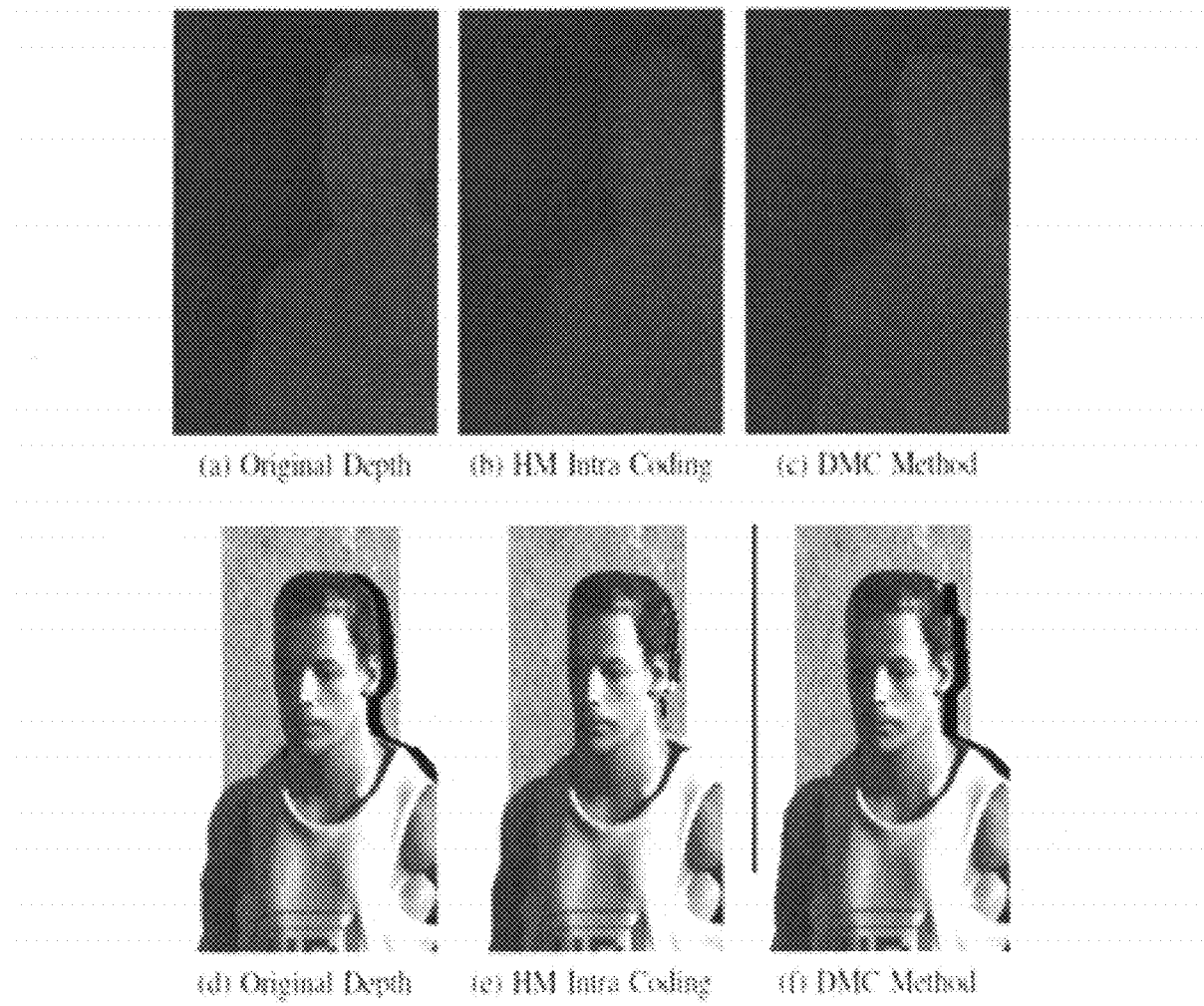
FIG. 4 shows a reconstructed view of a three-dimensional video coded by an apparatus according to an implementation form.

FIG. 4 shows a reconstructed view of a three-dimensional video coded by an apparatus according to an implementation form.

FIG. 4 depicts a reconstructed depth (top) and synthesis results (bottom) based on (a) uncompressed, (b) conventional intra coded and (c) DMC-based coded depth map at 0:0043 bit per pixel.

DMC has been integrated into the HEVC Test Model (HM3.0) as an alternative intra coding method to the conventional intra-prediction and transform-based algorithms. In the current implementation depth maps are coded independently of the accompanying texture video. Nevertheless, texture coding tools like quad-tree decomposition and the CABAC entropy coder are reused for depth map coding. In experiments, depth maps are coded with the HM 3.0 software, once with the default intra-coding tools and once with the proposed DMC method. To reach different bitrates for the DMC case, the Lagrange multiplier X of the RD cost function is varied. Both approaches perform equally well in almost all bit rate ranges. The measured PSNR is computed based on the reconstructed depth maps. Depth maps are typically not displayed themselves and can be seen as supplementary data to the texture videos. As they are utilized to synthesize arbitrary viewpoints at the receiver, PSNR curves give only a very rough idea of the depth map's quality. According to aspects of the disclosure, the most prominent advantage of a model-based approach compared to a conventional transform-based coder is the improved preservation of depth discontinuities due to the removal of ringing artifacts along object boundaries.

In the following, synthesized viewpoints based on compressed depth maps are presented to demonstrate the improvements in visual quality for those virtual views. For the generation of these experimental results texture data remained uncompressed to concentrate on depth coding artifacts. For view synthesis a modified version of the MPEG View Synthesis Reference Software (VSRS 3.5) was used. All the depth map improvement algorithms in VSRS are turned off to be able to compare pure synthesis artifacts introduced by the differently compressed depth maps.

In FIG. 4 typical reconstructed depth maps of the two different coding approaches can be seen in the top three images. While the conventional HM infra coding tools introduce strong blurring and ringing artifacts along depth discontinuities, the presented DMC algorithm according to aspects of the disclosure preserves those edge locations by approximating them with an explicit representation. Both shown depth maps are coded at 0:0043 bit per pixel and in terms of PSNR they have a very similar quality. More importantly, FIG. 4e shows the geometrical distortions introduced by the coding artifacts of the HM intra coding tools.

The blurred depth map along the man's face results in strong deformations of his head in the synthesized view. In contrast to this, the DMC method yields convincing synthesis quality (cf. FIG. 4f), which is relatively close to the synthesis based on the uncompressed depth map.

In this application, a novel model-based algorithm for coding depth maps is presented. It is demonstrated that the DMCcompressed depth maps result in visually improved synthesized views. The presented DMC method removes ringing artifacts as known from transform-based coders by explicitly signaling locations of depth discontinuities. The piecewise smooth regions of the depth data are modeled by either constant depth values or by a planar mode, which is able to model depth gradients. In comparison to conventional intracoding tools DMC results in depth maps, which introduce less geometrical distortions, as visualized based on our experimental results.

In an implementation form, the presented new intra-coding algorithm is incorporated into a motion-compensated scenario. For frames using temporal prediction model parameters are reused and updated to match temporal changes. In an implementation form, conventional intra-coding and model-based approaches are combined by predicting mode parameters from neighboring blocks. In an implementation form, encoding of texture and depth data is combined and the derivation of DMC's model parameters are improved by incorporating information from the corresponding texture.

The presented algorithm is implemented into the 3DV-HTM 3.1 reference software. The algorithm and its implementation do not interfere with other coding tools of the reference software and can therefore be uses in addition to all available tools. As three of the four DMC prediction modes are highly similar to the Depth Modeling Modes (DMM) that are already in the reference implementation, DMM is disabled for simulations. In the reference simulation, DMM was enabled.

DMC does not introduce significant additional computational complexity compared to the current 3DV-HTM 3.1 reference software. Only the Edge Prediction mode is relatively complex at the encoder side, as it needs to test all possible segmentations to find the optimum. This behavior is very similar to the DMM Wedgelet prediction that can be found in the current HTM reference software. All other DMC components and especially the decoder-side algorithms are very low complex as there is neither a dequantization nor an inverse transform for DMC-coded blocks involved.

The DMC simulations were performed according the common test conditions described in "MPEG Video and Requirement Groups, "Call for proposals on 3D video coding technology," MPEG output document N12036, Tech. Rep., March 2011". For the All-Intra coder configuration files from the Core Experiment 6.h on Depth Map Intra Coding Tools were. The only deviation from the common test conditions was the disabling of DMM for the DMC simulations, as DMM prediction modes are very similar to the prediction used in DMC and the complexity increase would be much larger with potentially little additional gain on bitrate savings. The measurement of the computational complexity is to be taken with care as it is based on a heterogeneous cluster with different hardware configurations.

Table 1 depicts the rate savings for the random access configuration and Table 2 depicts the rate savings for the all intra configuration.

TABLE 1

| random access configuration | | | |
|---|---|---|---|
| Synthesized Views | Synthesized Views | Complexity estimate (ratio to anchor) | |
| BD-rate (depth bitrate) | BD-rate (total bitrate) | Encoder Time, % | Decoder Time, % |
| S01 −1.24% | −1.01% | 131% | 127% |
| S02 −0.41% | 0.27% | 97% | 90% |
| S03 0.03% | −1.11% | 124% | 121% |
| S04 −4.34% | −0.36% | 102% | 102% |
| S05 −7.08% | −0.92% | 119% | 144% |
| S06 −6.31% | −0.55% | 85% | 83% |
| S08 −8.75% | −1.61% | 112% | 142% |
| Average −4.02% | −0.76% | 110% | 116% |

TABLE 2

| All Intra Configuration | | | |
|---|---|---|---|
| Synthesized Views | Synthesized Views | Complexity estimate (ratio to anchor) | |
| BD-rate (depth bitrate) | BD-rate (total bitrate) | Encoder Time, % | Decoder Time, % |
| S01 −16.16% | −2.54% | 116% | 73% |
| S02 −17.25% | 0.17% | 99% | 89% |
| S03 4.00% | −2.29% | 111% | 80% |
| S04 −36.57% | −2.43% | 136% | 72% |
| S05 −42.27% | −2.50% | 112% | 65% |
| S06 −35.10% | −1.02% | 113% | 95% |
| S08 −25.10% | 0.43% | 78% | 53% |
| Average −24.06% | −1.46% | 109% | 75% |

A cross check of the proposed method was done. No issues with the implementation were found.

In this application, a model-based algorithm for intra-coding of depth maps is presented. The presented DMC method removes ringing artifacts as known from transform-based coding by directly signaling the pixel-domain information in the bitstream. The piecewise smooth regions of depth data are predicted by either constant depth values or by a planar mode, which is able to model depth gradients. In the subsequent residual coding step the proposed Depth Lookup Table maps the residual DC values for each segment to residual indices, which are then entropy coded. Aspects of the disclosure show significant coding gain for intra coding of depth maps.

From the foregoing, it will be apparent to those skilled in the art that a variety of devices, methods, systems, computer programs on recording media, and the like, are provided.

The present disclosure also supports a computer program product including computer executable code or computer executable instructions that, when executed, causes at least one computer to execute the performing and computing steps described herein.

The present disclosure also supports a system configured to execute the performing and computing steps described herein.

Many alternatives, modifications, and variations will be apparent to those skilled in the art in light of the above teachings. Of course, those skilled in the art readily recognize that there are numerous applications of the disclosure beyond those described herein. While the present disclosures has been described with reference to one or more particular embodiments, those skilled in the art recognize that many changes may be made thereto without departing from the scope of the present disclosure. It is therefore to be understood that within the scope of the appended claims and their equivalents, the disclosures may be practiced otherwise than as specifically described herein.

What is claimed is:

1. An apparatus for coding a bit stream representing a three-dimensional video comprising a sequence of views, wherein a depth map is associated to each view, the depth map comprises depth information of each view with respect to a position to a camera capturing each view, the apparatus comprising:
   a partitioner configured to partition the depth map into coding units;
   a determiner configured to
     a. determine a type of model function for each coding unit based on the depth information of the coding unit,
     b. determine a DC type when the depth information of the coding unit indicates a constant depth,
     c. determine a gradient type when the depth information of the coding unit indicates a gradual depth change, and
     d. determine an edge type when the depth information of the coding unit indicates two segments of different but constant depths;
   a reducer configured to reduce the coding unit to a single residual value for each segment generated by the model function; and
   a signaler configured to signal the model function and the single residual value into the bitstream.

2. The apparatus of claim 1, further comprising:
   an indexer configured to index the depth information of the depth map with respect to depth levels indicated by the depth map which obtain indices associated to the depth information of the depth map; and
   a remapper configured to reduce a depth information size by remapping the depth map according to the obtained indices.

3. The apparatus of claim 2, wherein the indexer is configured to index the depth information of the depth map over a predetermined quantity of views; and wherein the remapper is configured to reduce the depth information using a lookup-table.

4. The apparatus of claim 2 comprising a mapper configured to map a depth level to its corresponding index in the depth map.

5. The apparatus of claim 1, wherein the partitioner is configured to partition the depth map into the coding units by:
   partitioning the depth map into fixed-sized coding units of a fixed size;
   arranging the coding units in a quad-tree structure by sub-dividing the fixed-sized coding units into the coding units of a variable size; and
   signaling the quad-tree structure into the bitstream.

6. The apparatus of claim 1, wherein the determiner is configured to a type of segmentation for a coding unit by predicting from coding units arranged in the neighborhood to the coding unit in a quad-tree structure.

7. The apparatus of claim 1, wherein the determiner is configured to determine the DC type of model function for a coding unit by:
   determining a DC value by predicting the depth information from one of a neighboring coding unit arranged to the left of a top-left corner pixel of the coding unit and a neighboring coding unit arranged to the top of the top-left corner pixel of the coding unit.

8. The apparatus of claim 1, wherein the determiner is configured to determine the gradient type of segmentation for a coding unit by:
- interpolating a gradual depth change of a bottom row of the coding unit from a first pixel in the bottom row of the coding unit to a target pixel in a lower-right corner of the coding unit;
- interpolating a gradual depth change of a right column from a second pixel in a right column of the coding unit to the target pixel in the lower-right corner of the coding unit; and
- bilinearly interpolating the gradual depth change from the gradual depth change of the bottom row and the gradual depth change of the right column.

9. The apparatus of claim 1, wherein the determiner is configured to determine the edge type of segmentation for a coding unit by:
- dividing the coding unit into two segments by a straight line;
- determining a DC value of a first one of the two segments by predicting the depth information from one of a neighboring coding unit arranged to the left of a top-left corner pixel of the coding unit and a neighboring coding unit arranged to the top of the top-left corner pixel of the coding unit; and
- determining a DC value of a second one of the two segments by predicting the depth information from one of a neighboring coding unit arranged to the right of a top-right corner pixel of the coding unit and a neighboring coding unit arranged to the top of the top-right corner pixel of the coding unit.

10. The apparatus of claim 1, wherein the apparatus is configured to switch the coding the bit stream with respect to one of the following segments of the bit stream:
- a sequence of views,
- a picture,
- a slice,
- a coding unit, and
- a prediction unit.

11. The apparatus of claim 1 comprising an interleaver configured to interleave the coding units with coding units of the bit stream coded according to a conventional video coding.

12. The apparatus of claim 1, where the fixed size comprises 64×64 pixels.

13. The apparatus of claim 1, where the variable size of the coding units ranges from 4×4 pixels to 64×64 pixels.

14. The apparatus of claim 1, wherein the bit stream is coded according to a High Efficiency video coding (HEVC) or according to an Advanced video coding (AVC).

15. A method for coding a bit stream representing a three-dimensional video comprising a sequence of views, wherein a depth map is associated to each view, the depth map comprises depth information of the view with respect to a position to the camera capturing the view, the method comprising:
- partitioning the depth map into coding units;
- determining a type of model function for each coding unit based on the depth information of the coding unit and also determining;
  - a) a DC type when the depth information of the coding unit indicates a constant depth,
  - b) a gradient type when the depth information of the coding unit indicates a gradual depth change, and
  - c) an edge type when the depth information of the coding unit indicates two segments of different but constant depths;
- reducing the coding unit to a single residual value for each segment generated by model function; and
- signaling the model function used and the residual value into the bitstream.

16. The method of claim 15, wherein partitioning the depth map into coding units includes:
- partitioning the depth map into fixed-sized coding units of a fixed size;
- arranging the coding units in a quad-tree structure by sub-dividing the fixed-sized coding units into the coding units of a variable size; and
- signaling the quad-tree structure into the bitstream.

17. A computer product for coding a bit stream representing a three-dimensional video comprising a sequence of views, wherein a depth map is associated to each view, the depth map comprises depth information of the view with respect to a position to the camera capturing the view, the computer product comprises a processor and a non-transitory processor-readable medium, having processor-executable instructions stored thereon, wherein when executed, the processor-executable instructions cause the processor to partition the depth map into coding units;
- determine a type of model function for each coding unit based on the depth information of the coding unit and also determine
  - a) a DC type when the depth information of the coding unit indicates a constant depth,
  - b) a gradient type when the depth information of the coding unit indicates a gradual depth change, and
  - c) an edge type when the depth information of the coding unit indicates two segments of different but constant depths;
- reduce the coding unit to a single residual value for each segment generated by model function; and
- signal the model function used and the residual value into the bitstream.

18. The computer product of claim 17, wherein partitioning the depth map into coding units by the processor includes:
- partitioning the depth map into fixed-sized coding units of a fixed size;
- arranging the coding units in a quad-tree structure by sub-dividing the fixed-sized coding units into the coding units of a variable size; and
- signaling the quad-tree structure into the bitstream.

* * * * *